E. S. NICHOLS.
SAFETY DEVICE FOR TRACTORS.
APPLICATION FILED MAR. 12, 1921.

1,436,191.

Patented Nov. 21, 1922.

Inventor
Elliott S. Nichols
By Whittemore Hulbert Whittemore
& Belknap
Attorneys Patented Nov. 21, 1922.

1,436,191

UNITED STATES PATENT OFFICE.

ELLIOTT S. NICHOLS, OF DETROIT, MICHIGAN.

SAFETY DEVICE FOR TRACTORS.

Application filed March 12, 1921. Serial No. 451,853.

*To all whom it may concern:*

Be it known that I, ELLIOTT S. NICHOLS, a citizen of the United States of America, residing at Detroit, in the county of Wayne and State of Michigan, have invented certain new and useful Improvements in Safety Devices for Tractors, of which the following is a specification, reference being had therein to the accompanying drawings.

The invention relates to tractors of that type in which the driving wheels are at the rear and the center of gravity of the machine is not far in advance of the axis of said wheels. With such constructions there is great danger of upsetting or overturning the machine in case of an over-load and as the driver's seat is at the rear, serious accidents have often occurred. It is the object of the present invention to provide means for stopping the driving force whenever the body of the machine is lifted and thereby avoiding accidents. To this end the invention consists in the construction as hereinafter set forth.

Figure 1:
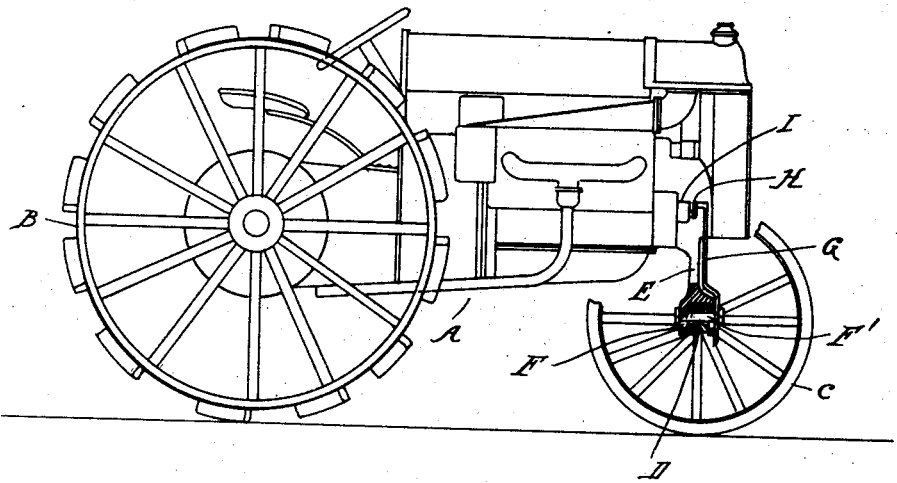
Figure 1 is a side elevation of the tractor, to which my improvement is applied.
Figure 2:
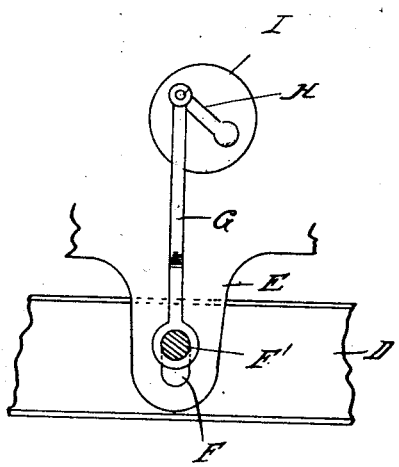
Figure 2 is a sectional front elevation.

A is the frame of the tractor on which the engine transmission and other parts are mounted, B are the driving wheels, and C are the front steering wheels which are mounted upon an axle D pivotally connected to a depending portion E of the frame. As the tractive power of the machine is dependent upon placing a sufficient load upon the tractor wheels, it is usual to so design the machine that the center of gravity is not far in advance of the axis of said driving wheels. Therefore, as has been previously described, an overload or draft upon the tractor or an obstruction which prevents its progress may result in up-ending and overturning the same. To avoid such a result, it is necessary either to release the load or to stop the power before the center of gravity is shifted to a point in rear of the drive wheel axis. This I do by providing means for breaking the ignition circuit or otherwise stopping the motor or the transmission of power therefrom upon the lifting of the forward end of the machine. The forward axle D is, as has been stated, pivotally connected to the depending portion E of the frame and by providing a slot F or other lost-motion connection, said axle is permitted to remain on the ground after the initial lifting movement of the frame. As shown, a rod G is connected at its lower end with the pivot F' and at its upper end with a lever H of the circuit-breaking switch I, which latter is mounted on a frame. When the frame is lifted carrying upward with it the switch I, the rod G will pull upon the lever H and open the ignition circuit, which will stop the engine and the transmission of power.

One advantage of my construction is that the operation is not dependent in any way upon the nature of the ground over which the tractor is traveling. Thus it has an advantage over devices which are operated by a trailer or some device projecting rearward from the machine and in contact with the ground for with such constructions the passage over irregular ground may result in releasing the load or in stopping the engine where there is no necessity of so doing. My device, on the contrary, will only operate where the engine and other heavy parts of the machine are being lifted and when this occurs there is always danger of capsizing the machine.

What I claim as my invention is:

1. In a tractor, the combination with a frame, a motor mounted thereon, a circuit breaking switch for said motor and a traction wheel at the rear of said frame driven by said motor, of a forward wheel on which said frame is also supported, and a lost motion connection between said forward wheel and frame, comprising an axle for said forward wheel, a depending slotted portion upon said frame pivotally connected with said axle, a stay-bolt secured to said axle and passing through said slot, and a lever mechanism connected with said circuit breaking switch and stay-bolt for breaking the circuit to said motor when said frame is lifted from said axle substantially the distance of said slot.

2. In a tractor, the combination with a frame, a motor mounted thereon, a circuit breaking switch for said motor and a traction wheel at the rear of said frame driven by said motor, of a forward wheel on which said frame is also supported, and a lost motion connection between said forward wheel and frame comprising an axle for said forward wheel, a depending slotted projection upon said frame pivotally connected with said axle, a stay-bolt secured to said axle and passing through said slot, and a lever having one end attached to said stay-bolt and the other end to a control lever for said circuit-breaking switch, said levers acting to break the circuit to said motor when said frame is lifted from said axle substantially the distance of said slot.

In testimony whereof I affix my signature.

ELLIOTT S. NICHOLS.